(12) United States Patent
Pidhajecky (10) Patent No.: US 9,021,390 B1
(45) Date of Patent: Apr. 28, 2015

(54) METHODS AND APPARATUS FOR OPTIMIZED PAUSING OF AN EMBEDDED APPLICATION TO RENDER POP-UP WINDOW

(75) Inventor: Damon Stefan Franklin Pidhajecky, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 436 days.

(21) Appl. No.: 12/774,647

(22) Filed: May 5, 2010

(51) Int. Cl.
*G06F 3/0481* (2013.01)
*A63F 13/30* (2014.01)
*H04L 29/06* (2006.01)
*G06F 9/445* (2006.01)

(52) U.S. Cl.
CPC .............. *G06F 3/0481* (2013.01); *A63F 13/12* (2013.01); *G06F 9/44526* (2013.01); *H04L 29/06034* (2013.01)

(58) Field of Classification Search
CPC . A63F 13/12; H04L 29/06034; G06F 3/0485; G06F 3/048; G06F 3/0481; G06F 9/4443; G06F 9/44526
USPC .............................. 715/760, 764, 808; 463/42
See application file for complete search history.

(56) References Cited

U.S. PATENT DOCUMENTS

| | | | | |
|---|---|---|---|---|
| 6,075,532 | A * | 6/2000 | Colleran et al. ............... | 345/473 |
| 6,272,650 | B1 * | 8/2001 | Meyer et al. ................ | 714/38.14 |
| 6,377,281 | B1 * | 4/2002 | Rosenbluth et al. .......... | 715/700 |
| 6,570,578 | B1 * | 5/2003 | Smirnov et al. ............... | 345/629 |
| 6,597,857 | B1 * | 7/2003 | Clapper ......................... | 386/234 |
| 6,616,533 | B1 * | 9/2003 | Rashkovskiy .................. | 463/31 |
| 7,069,044 | B2 * | 6/2006 | Okada et al. ............... | 455/556.1 |
| 7,511,718 | B2 * | 3/2009 | Subramanian et al. ........ | 345/619 |
| 7,729,946 | B2 * | 6/2010 | Chu ............................ | 705/26.61 |
| 8,082,523 | B2 * | 12/2011 | Forstall et al. ................. | 715/863 |
| 2003/0037068 | A1 * | 2/2003 | Thomas et al. ............... | 707/200 |
| 2004/0221002 | A1 * | 11/2004 | Karim ............................ | 709/203 |
| 2006/0068861 | A1 * | 3/2006 | Triestram et al. ................. | 463/1 |
| 2006/0123340 | A1 * | 6/2006 | Bailey et al. .................. | 715/700 |
| 2006/0148571 | A1 * | 7/2006 | Hossack et al. ................ | 463/43 |
| 2006/0248036 | A1 * | 11/2006 | Stanev et al. ..................... | 707/1 |
| 2007/0094612 | A1 * | 4/2007 | Kraft et al. ..................... | 715/808 |
| 2007/0192818 | A1 * | 8/2007 | Bourges-Sevenier et al. .............................. | 725/132 |
| 2008/0015003 | A1 * | 1/2008 | Walker et al. ...................... | 463/1 |
| 2008/0021775 | A1 * | 1/2008 | Lerman et al. .................. | 705/14 |
| 2008/0207328 | A1 * | 8/2008 | Slough et al. ................... | 463/42 |
| 2008/0300053 | A1 * | 12/2008 | Muller ............................ | 463/31 |
| 2009/0280905 | A1 * | 11/2009 | Weisman et al. ............... | 463/40 |
| 2009/0288098 | A1 * | 11/2009 | Abd-El-Malek et al. ..... | 719/312 |
| 2009/0327953 | A1 * | 12/2009 | Honkala et al. ............... | 715/804 |
| 2010/0009747 | A1 * | 1/2010 | Reville et al. .................... | 463/31 |
| 2010/0146085 | A1 * | 6/2010 | Van Wie et al. ............... | 709/220 |
| 2010/0210357 | A1 * | 8/2010 | Slough et al. ................... | 463/30 |
| 2011/0022984 | A1 * | 1/2011 | van der Meulen et al. ... | 715/830 |
| 2011/0086706 | A1 * | 4/2011 | Zalewski ........................ | 463/36 |

* cited by examiner

*Primary Examiner* — James T Durkin
(74) *Attorney, Agent, or Firm* — Martine Penilla Group, LLP (57) ABSTRACT

Methods and systems executing an embedded application within the context of a first client application are provided. One method includes executing application logic to adjust states of one or more display objects and rendering one or more of the one or more display objects that are associated with a stage definition in a display region of the first client application. In response to a trigger event, the method causes the first application to generate a interface component, such as a pop-up, in the display region and pausing the rendering of the embedded application. The pausing includes generating a static image based on the states of the one or more display objects associated with the stage definition, associating the static image with the stage definition and disassociating the one or more display objects from the stage definition.

8 Claims, 6 Drawing Sheets

METHODS AND APPARATUS FOR OPTIMIZED PAUSING OF AN EMBEDDED APPLICATION TO RENDER POP-UP WINDOW

TECHNICAL FIELD

The present disclosure generally relates to optimizing pop-up windows in a web browser environment having a Flash or other plug-in rendered media object embedded in an underlying structured document for display.

BACKGROUND

A web browser is a software application, which may be executed on a network device, for retrieving, presenting, and traversing information or network resources on a computer network, such as the World Wide Web, the Internet, or an Intranet. Examples of web browsers include Microsoft Internet Explorer, Mozilla Firefox, and Google Chrome. Typically, an information or network resource is identified by a unique Uniform Resource Identifier (URI), and may be in a variety of formats, such as web page, image, video, audio, and executable. A web browser may retrieve specific information or network resources using their corresponding URIs.

Web browsers have become increasingly sophisticated as time passes and are able to support more and more functionalities. Initially, web pages were static and encoded using Hyper Text Markup Language (HTML). Later, various programming languages, such as Java, JavaScript, VBScript, and PHP, have been developed that enable dynamic web pages to be implemented and significantly improve the interactive experiences for network users. Additionally, various objects or references to objected embedded in an underlying web page can be consumed and rendered by a plug-in to a browser. Presently, network users may perform various activities on a computer network, such as the Internet, through their web browsers. For example, a network user may conduct business (e.g., Internet banking), socialize with families and friends (e.g., Facebook, MySpace, and Twitter), and seek recreation and entertainment (e.g., YouTube and Zynga) all on his computer.

SUMMARY

The present disclosure generally relates to optimizing pop-up windows in a web browser environment having a Flash or other plug-in rendered media object embedded in an underlying structured document for display.

Particular embodiments, execute an embedded application within the context of a first client application. To execute the embedded application, particular embodiments execute application logic to adjust states of one or more display objects; render one or more of the one or more display objects that are associated with a stage definition in a display region of the first client application; and in response to a trigger event, cause the first application to generate a interface component in the display region and pausing the rendering of the embedded application by generating a static image based on the states of the one or more display objects associated with the stage definition; associating the static image with the stage definition; and disassociating the one or more display objects from the stage definition.

These and other features, aspects, and advantages of the disclosure are described in more detail below in the detailed description and in conjunction with the following figures.

DETAILED DESCRIPTION

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A web page is a structured document or resource of information that is suitable for a computer network, such as the World Wide Web, the Internet, or an Intranet. A web page is identified by a unique Uniform Resource Locator (URL) and may be accessed through a web browser and displayed on the screen of a network device. Sophisticated web pages are dynamic, such that a dynamic web page is constructed at the time it is requested by a network user via his web browser. As a result, the actual content included in a dynamic web page may vary from time to time. Moreover, sophisticated web pages may include multimedia content (e.g., image, video, or audio), or embedded references thereto, as well as text content. For example, a network user may watch video, listen to audio, or play games embedded in web pages.

Figure 1A:
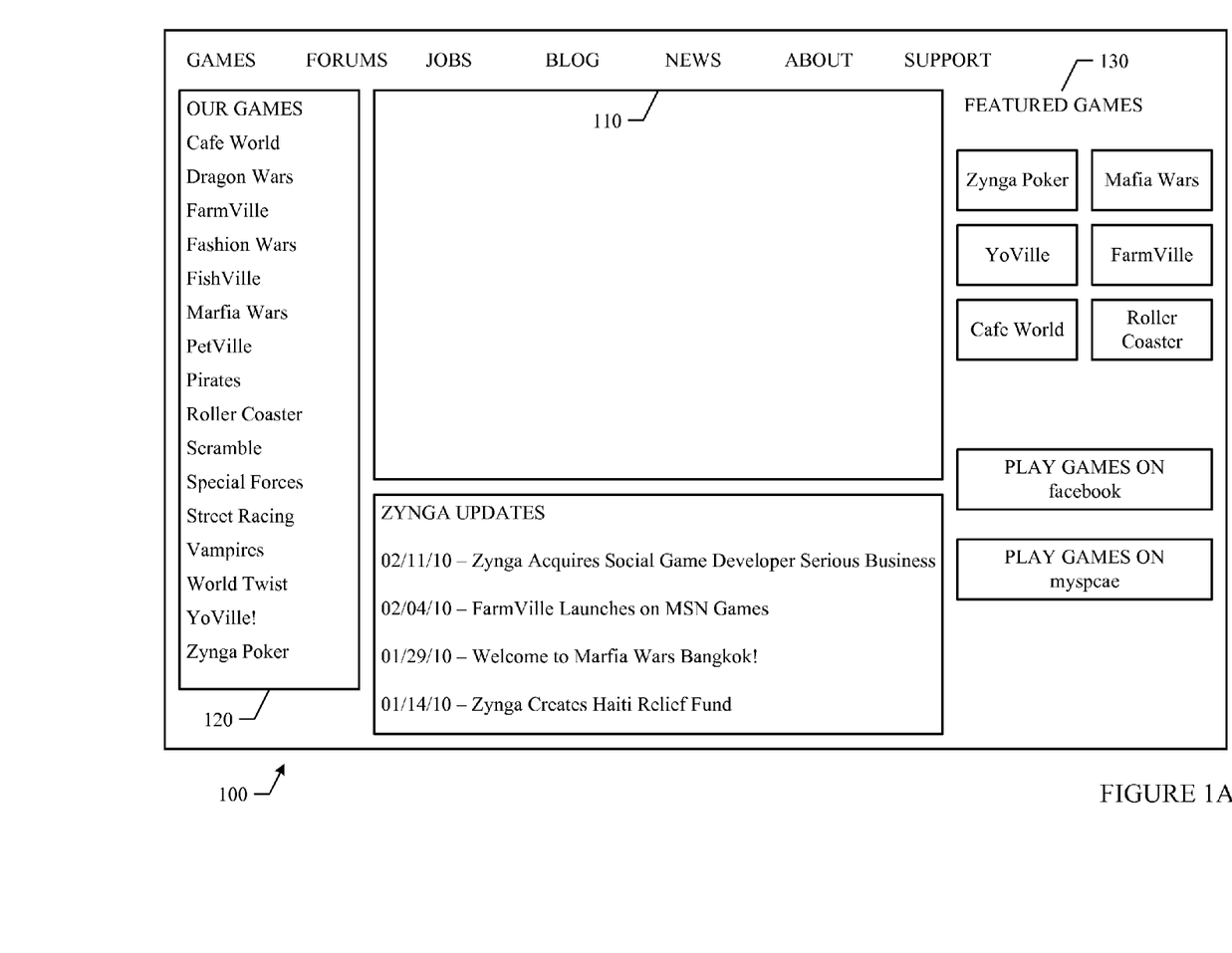
FIG. 1A illustrates an example web page with an embedded Flash display.

FIG. 1A illustrates an example web page 100. Web page 100 is specifically designed to enable network users to play games online via their web browsers. In this context, these network user may also be referred to as game players. There is a list 120 of available games from which a game player may select to play. There are several featured games 130 that may be popular among the game players. The game that is currently being played is displayed in the center of web page 100, as an embedded Flash component 110. In this sense, the Flash component may be considered as a "container" of the game application.

Adobe Flash (formerly known as Macromedia Flash) is a multimedia platform for adding animation and interactivity to web pages. A Flash component (e.g., Flash component 110) may be embedded in a web page (e.g., web page 100) to create animation, advertisements, or games and to integrate video into the web page. Flash may also be used to develop rich Internet applications. Flash can manipulate vector and raster graphics and support bidirectional streaming of audio and video. It contains a scripting language, called ActionScript. ActionScript is an object-oriented programming language having a syntax similar as that of JavaScript but with a different associated set of class libraries. ActionScript may be used to create almost all of the interactivity seen in Flash applications. Flash in the SWF format, traditionally called "ShockWave Flash" movies, "Flash movies", or "Flash games", usually have a .swf file extension and may be an embedded object of a web page. Flash video files have a .flv extension and are either used from within the .swf files or played through a fly-aware player or web browser. More recently, the Flash libraries are used with the Extensible Markup Language (XML) capabilities of the web browsers to render rich content in the browsers. This technology is known as Asynchronous Flash and XML. To interoperate with browser client applications, the Flash client application can be installed as a so-called browser plug-in. The browser plug-in can be activated or initialized when an objected embedded in a given web page or other structured document is encountered. For example, when a browser client encounters a *.swf object, the Flash client plug-in can be activated to process the object and render an output.

In particular embodiments, a game application may include several components. For example, a game may include game logic and definitions of multiple objects to be rendered. The game logic can receive inputs such as key strokes and mouse clicks and process the inputs to adjust the state of one or more of the graphical objects to be rendered. A rendering component of the Flash plug-in may iteratively process the graphical objects at some frame rate to render the resulting graphical output. There may be multiple objects involved in a game, including the characters and other types of objects. For example, with a war game, the characters may be the soldiers fighting on both sides of the war. In addition, there may be weapons used by the soldiers and the objects around the battlefield (e.g., buildings, trees, animals, mountains, rivers, and so on). Each game object may be defined according to a predetermined syntax. For example, the definition of a game object may include its shape, texture, physical capabilities, its connection or relationship with other game objects, and so on. Second, there may be a set of game logic that controls the development and progression of the game. The game logic indicates what should happen in response to an event occurring in the game. For example, with the war game, if one solider shoots another solider, the game logic may indicate that the other solider should be wounded or even die as a result of the shooting event.

Figure 3A:
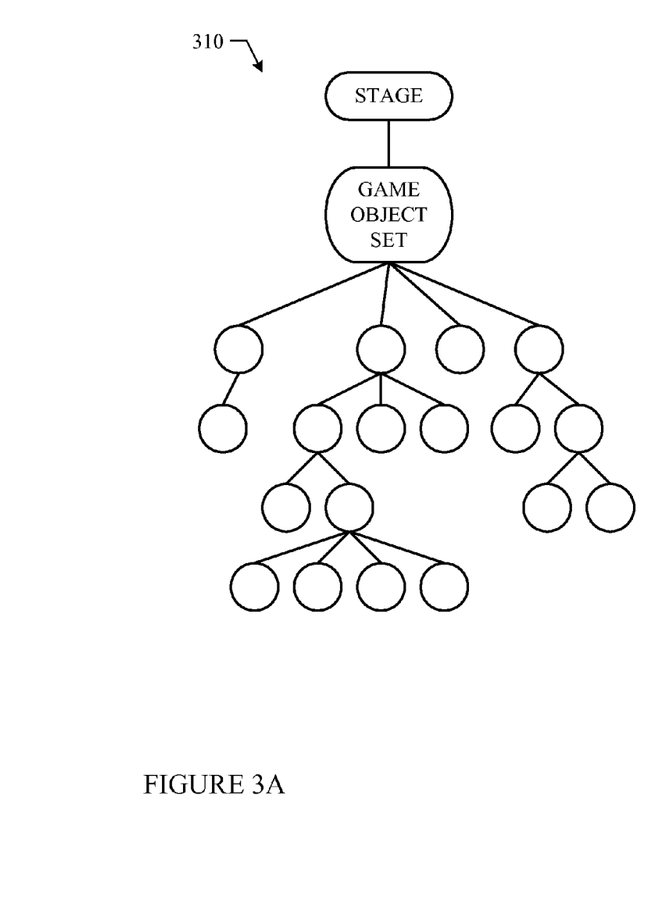
FIG. 3A illustrates an example stage associated with a set of game objects.

In particular embodiments, a game application may be embedded in a web page (e.g., web page 100) so that the game players may play the game via their web browsers. In particular embodiments, a Flash component (e.g., Flash component 110) may be included in the web page and a Flash plug-in may be used to render the game scenes within the context of the browser client window. In particular embodiments, the display of a game may be referred to as the "stage" of the game. Thus, the stage of the game may be implemented as the Flash component embedded in the web page. For example, the stage is essentially a data structure that defines some of the basic elements of the game, such as aspect ration and display size. Data objects attached to or associated with the stage are rendered by the Flash plug-in. At any given time, a game scene may be rendered and displayed on the stage by attaching one or more game objects to the stage. Each game scene may include a set of game objects. In particular embodiments, the game objects of a game scene may be arranged in a hierarchical structure under the stage. FIG. 3A illustrates an example stage 310 associated with a set of game objects arranged in a hierarchy. Each circular node in the hierarchy represents a particular game object. Of course, different game scenes may include different game objects, and similarly, the same game object may have different appearances in different game scenes. Consequently, in particular embodiments, to render and display each game scene on the stage, a Flash plug-in module may process the definition of the game objects under the stage according to the game logic to determine the current game scene that should be displayed on the stage, and then render and display the current game scene within the context of the browser client window.

Rendering a game scene for display may require a great amount of computer resources (e.g., processor time or cache) due to the large number of operations that need to be performed, some of which being very computational intensive. For example, in connection with a single game scene, the application may need to determine which objects are in the game scene, each object's position in the game scene, each object's appearance including shape, texture, orientation, and lighting, resolve possible conflicts and errors among the objects, and so on. In addition, a game can be displayed at least at 28 or 30 frames per second, and often at 45, 50, or 60 frames per second, which means 30, 45, or 60 renderings per second. This may result in a network device devoting most, if not all, of its available resources to the continuous rendering of the game scenes embedded in a web page.

Figure 1B:
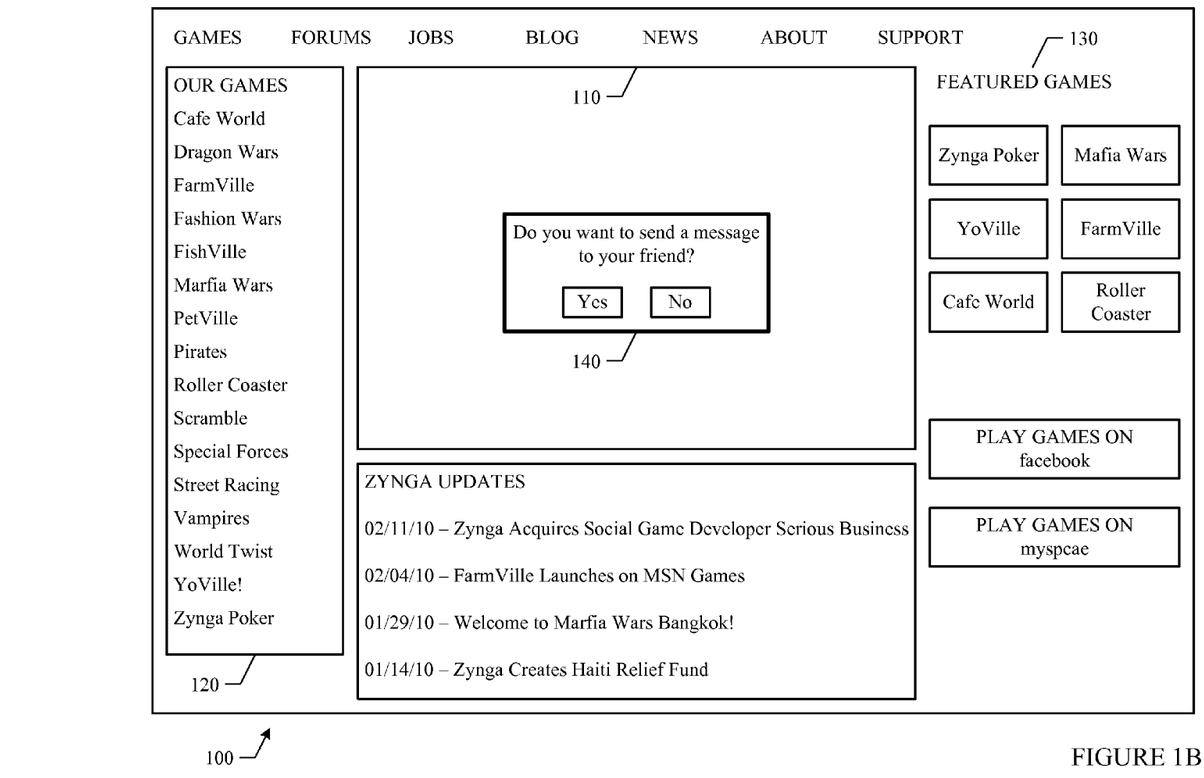
FIG. 1B illustrates an example web page with a pop-up window.

If, while a game is being played via a web page (i.e., while the game scenes are continuously rendered and displayed), any other action occurs within the context of the web page or within the context of the web browser displaying the web page but outside of the context of the game application itself, there may not be sufficient computer resources to respond to this other action quickly. For example, a pop-up window is a user-interface component that is often used to communicate a message to the game player. Typically, a pop-up window appears (i.e., pops up) on top of another window (e.g., the web browser) temporarily to display the message and goes away after the message has been received by the game player. The pop-up window may also enable the game player to provide a response to the message. FIG. 1B illustrates example web page 100 now with a pop-up window 140 on top of it. In particular embodiments, pop-up window 140 may be triggered by any event, including an event occurring within the context of the game application embedded in web page 100 or within the context of web page 100 but outside of the context of the embedded game application. In this example, pop-up window 140 asks the game player whether he wants to send a message to his friend, and the game player may respond either "Yes" or "No" by clicking on the appropriate button. Once the game player clicks on one of the buttons, pop-up window 140 disappears. The message is either send or not send to the friend of the game player depending on the game player's response. In particular embodiments, pop-up window 140 may be implemented using a suitable scripting language, such as JavaScript, and therefore, is not handled by Flash, which is responsible for rendering the game scenes for display in Flash component 110. The Flash plug-in supports external interfaces that allow for interactivity between a Flash component and an external module, such as a JavaScript module executing within the context of a structured document. Accordingly, the game logic of the Flash-based game application, for example, may make calls to a JavaScript library embedded in the same underlying webpage to display a pop-up window. The JavaScript module executing within the context of the web page can also make calls to the Flash-based game application.

Figure 2:
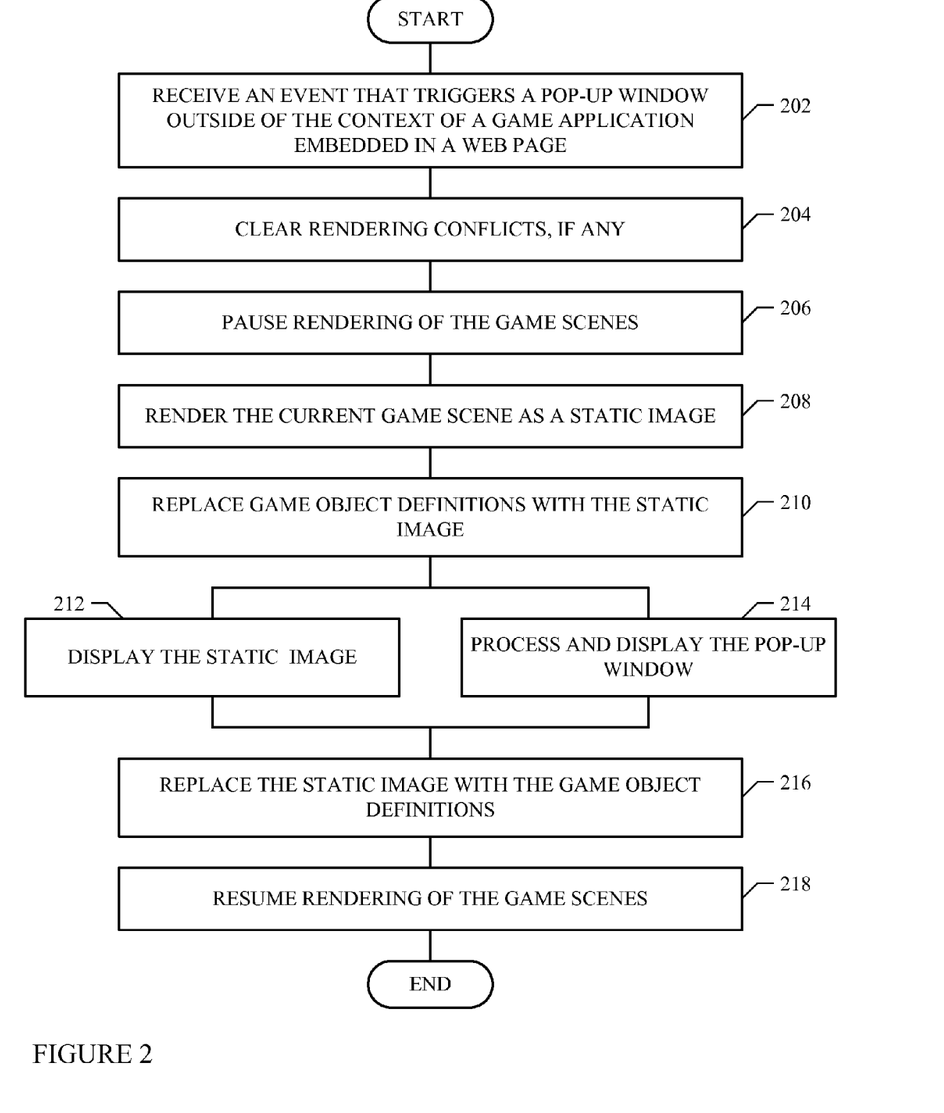
FIG. 2 illustrates an example method for optimizing pop-up windows.

Suppose pop-up window 140 appears while a game player is playing the game embedded in web page 100. Because the rendering of the game scenes may require a large amount of computer resources, it may take some time (e.g., up to 30 seconds) for pop-up window 140 to appear on web page 100 as the handling of pop-up window 140 competes for the available computer resources with the rendering of the game scenes. FIG. 2 illustrates an example method for optimizing pop-up windows under such circumstances in order to improve the interactive experiences for the game player. The process illustrated in FIG. 2 is executed within the context of the Flash client plug-in and, in some implementation, may be implemented using ActionScript or any other suitable programming language.

In particular embodiments, suppose a game application is embedded in a web page. The game scenes are rendered and displayed within a Flash component included in the web page, and the display is referred to as the stage of the game application. The game application includes the definitions of the game objects and game logic. The game scenes are continuously rendered and displayed by the browser client plug-in. The display rate may be constant or varying. Each game scene is rendered on the stage by the client plug-in based on the game object definitions as modified by the game logic. In particular embodiments, to render a game scene, client plug-in processes the set of game objects under the stage (e.g., stage 310) based on their respective current states as modified by game logic and renders the game scene using the definitions of the game objects under the stage. While the game is being played, suppose an event occurs that triggers a user-interface component (e.g., a pop-up window) outside of the context of the game application embedded in the web page to be displayed (step 202 of FIG. 2). In particular embodiments, the triggering event may be an event within the context of the embedded game application or within the context of the web page but outside the context of the embedded game application. In particular embodiments, the pop-up window is handled outside the context of the embedded game application (e.g., implemented by JavaScript), and therefore, is not a part of the rendering done by Flash.

In response to the triggering event, a code module executing within the context of the client plug-in clears currently existing rendering conflicts, if any (step 204 of FIG. 2). Rendering conflicts may result from some type of error occurring within the game itself, including the game logic or the game object definitions. Alternatively, rendering conflicts may result from how different web browsers handle web pages and programming code differently. Once all rendering conflicts have been cleared, the code module may pause the continuous rendering of the game scenes (step 206 of FIG. 2), as described below. In particular embodiments, only the rendering of the game scene is paused; the game itself and the game logic continue to develop and progress. In particular embodiments, the game application logic keeps a record of the game logic progression and continues to execute according to its timeline and adjust the state of any game objects so that when the rendering of the game scenes are resumed later, the most current game object state is rendered.

Figure 3B:
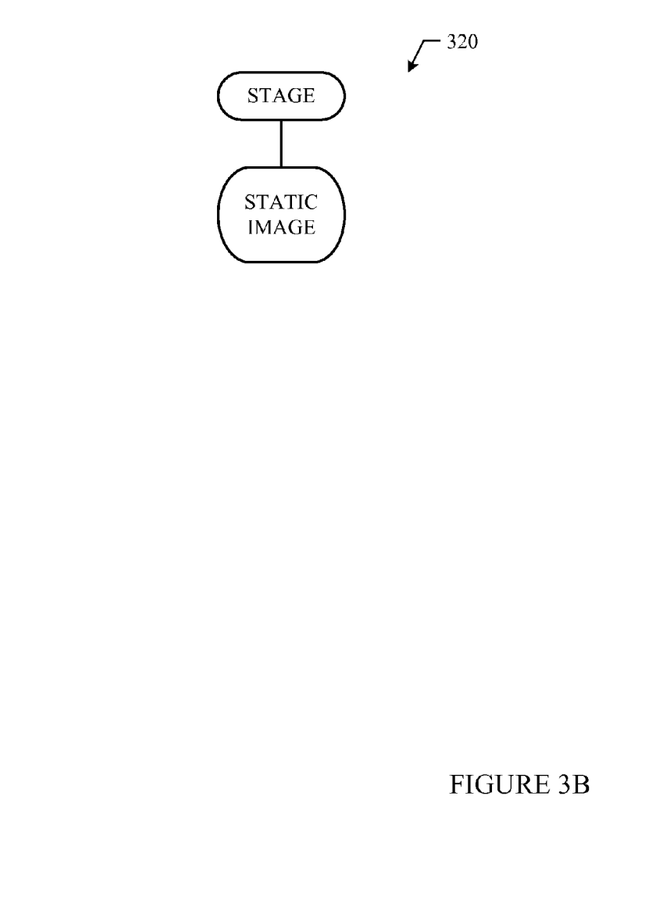
FIG. 3B illustrates an example stage associated with a static image.

In particular embodiments, the code module causes the client plug-in to render the current game scene as a static image (e.g., a bitmap image) using the game object definitions (step 208 of FIG. 2). This rendering may be performed in the same way as rendering any other game scenes and may be done using Flash. Particular embodiments then replace the game object definitions of the stage with the bitmap of the statically rendered image (step 210 of FIG. 2). The game object definitions continue to be maintained in memory, but for a period of time, are not associated with, or attached to, the stage and therefore are not processed by the client plug-in. FIG. 3B illustrates an example representation of a stage 320 having a static image bitmap under it. The static image in FIG. 3B may replace the set of game objects in FIG. 3A. Since the Flash plug-in processes the set of game objects under the stage to render the game scene, replacing the game object definitions with the static image, the Flash plug-in no longer needs the same level of computing resources required to process the complex game object definitions. In one embodiment, the Flash client plug-in Flash may take the already rendered static image under the stage and display it without much further processing. As a result, merely displaying the static image requires much less computer resources than to render and display game scenes one at a time.

Particular embodiments may display the static image (step 212 of FIG. 2) in the Flash component included in the web page while processing and displaying the pop-up window (step 214 of FIG. 2). Because computer resources have been freed up from rendering the game scenes, there are more computer resources to execute the JavaScript code that implements the pop-up window. As a result, the pop-up window may be processed and displayed in a shorter time as its processing no longer needs to compete with the resource intensive processes associated with rendering of the game scenes.

Once the pop-up window has been handled (e.g., the game player has responded to the message included in the pop-up window), the pop-up window may go away and the rendering of the game scenes may resume. In one implementation, the JavaScript code module may make a call to the embedded game signaling that it should resume rendering of the game application. The JavaScript module may be configured to signal the game application after a user has completed or responded to the pop-up window or after a threshold period of time after the pop-up window was presented to the user. Particular embodiments may replace the static image associated with the stage with the original set of game objects under the stage (step 216 of FIG. 2). Programmatically, this can be accomplished by re-attaching the game object definitions to the stage and disassociating the static bitmap image. By replacing the static image with the game object definitions, when any subsequent game scenes need to be displayed in the Flash component included in the web page, Flash may resume rendering of the game scenes based on the game object definitions and the game logic as before since Flash processes the objects associated with the stage (step 218 of FIG. 2). In this manner, a pop-up window can be implemented more quickly (by reducing resource contention), while the rendered static bit map preserves some aspect of visual continuity for the user as the pop-up window is rendered over a portion of the game display window.

Of course, pop-up windows are just one type of user-interface component that may be implemented to interact with game players, and the present disclosure contemplates any suitable user-interface components. The same concept described in FIG. 2 may be applied when any other type of user-interface components outside of the context of an embedded game application is triggered. In addition, games represent only one type of application, in connection with which the present application can be used. The present disclosure contemplates any situation where one application is embedded in another application. In addition, while the embodiments described above operate in connection with Flash, the present invention can be used in connection with other types of plug-in clients, such as Microsoft's Silverlight rendering technologies.

Figure 4:
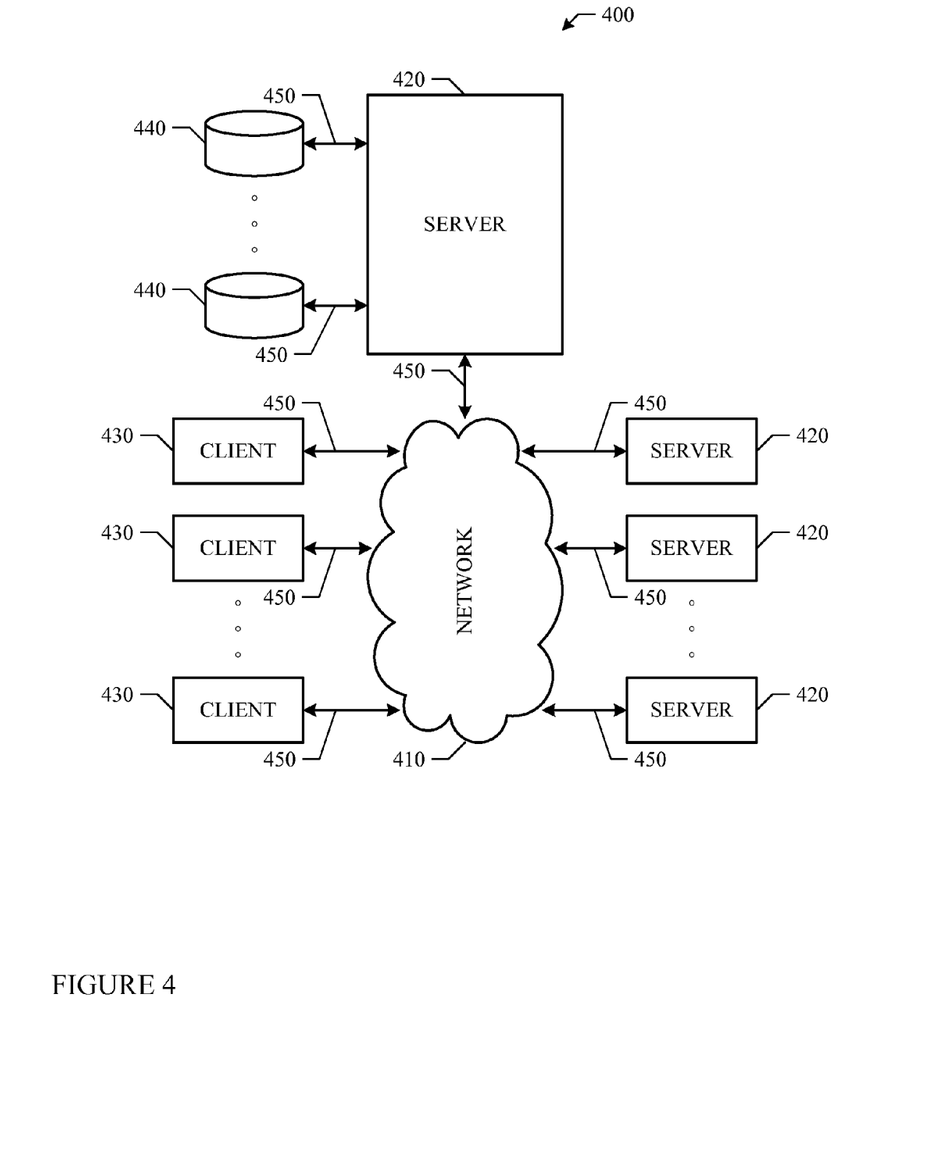
FIG. 4 illustrates an example network environment.

Particular embodiments may be implemented in a network environment. FIG. 4 illustrates an example network environment 400 suitable for providing software validation as a service. Network environment 400 includes a network 410 coupling one or more servers 420 and one or more clients 430 to each other. In particular embodiments, network 410 is an intranet, an extranet, a virtual private network (VPN), a local area network (LAN), a wireless LAN (WLAN), a wide area network (WAN), a metropolitan area network (MAN), a portion of the Internet, or another network 410 or a combination of two or more such networks 410. The present disclosure contemplates any suitable network 410.

One or more links 450 couple a server 420 or a client 430 to network 410. In particular embodiments, one or more links 450 each includes one or more wireline, wireless, or optical links 450. In particular embodiments, one or more links 450 each includes an intranet, an extranet, a VPN, a LAN, a WLAN, a WAN, a MAN, a portion of the Internet, or another link 450 or a combination of two or more such links 450. The present disclosure contemplates any suitable links 450 coupling servers 420 and clients 430 to network 410.

In particular embodiments, each server 420 may be a unitary server or may be a distributed server spanning multiple computers or multiple datacenters. Servers 420 may be of various types, such as, for example and without limitation, web server, news server, mail server, message server, advertising server, file server, application server, exchange server, database server, or proxy server. In particular embodiments, each server 420 may include hardware, software, or embedded logic components or a combination of two or more such components for carrying out the appropriate functionalities implemented or supported by server 420. For example, a web server is generally capable of hosting websites containing web pages or particular elements of web pages. More specifically, a web server may host HTML files or other file types, or may dynamically create or constitute files upon a request, and communicate them to clients 430 in response to HTTP or other requests from clients 430. A mail server is generally capable of providing electronic mail services to various clients 430. A database server is generally capable of providing an interface for managing data stored in one or more data stores.

In particular embodiments, one or more data storages 440 may be communicatively linked to one or more severs 420 via one or more links 450. In particular embodiments, data storages 440 may be used to store various types of information. In particular embodiments, the information stored in data storages 440 may be organized according to specific data structures. In particular embodiment, each data storage 440 may be a relational database. Particular embodiments may provide interfaces that enable servers 420 or clients 430 to manage, e.g., retrieve, modify, add, or delete, the information stored in data storage 440.

In particular embodiments, each client 430 may be an electronic device including hardware, software, or embedded logic components or a combination of two or more such components and capable of carrying out the appropriate functionalities implemented or supported by client 430. For example and without limitation, a client 430 may be a desktop computer system, a notebook computer system, a netbook computer system, a handheld electronic device, or a mobile telephone. The present disclosure contemplates any suitable clients 430. A client 430 may enable a network user at client 430 to access network 430. A client 430 may enable its user to communicate with other users at other clients 430.

A client 430 may have a web browser 432, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 430 may enter a Uniform Resource Locator (URL) or other address directing the web browser 432 to a server 420, and the web browser 432 may generate a Hyper Text Transfer Protocol (HTTP) request and communicate the HTTP request to server 420. Server 420 may accept the HTTP request and communicate to client 430 one or more Hyper Text Markup Language (HTML) files responsive to the HTTP request. Client 430 may render a web page based on the HTML files from server 420 for presentation to the user. The present disclosure contemplates any suitable web page files. As an example and not by way of limitation, web pages may render from HTML files, Extensible HyperText Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 5:
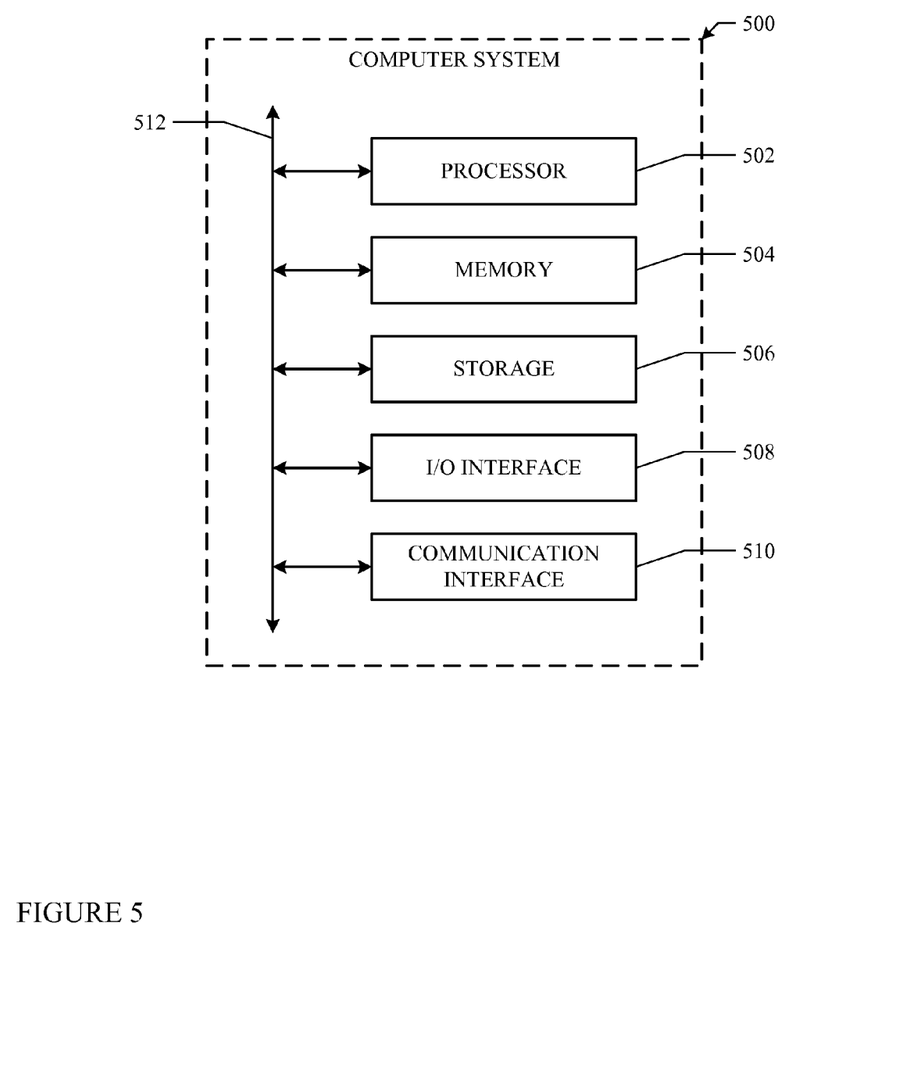
FIG. 5 illustrates an example computer system.

Particular embodiments may be implemented on one or more computer systems. FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. The present disclosure contemplates processor 502 including any suitable number of any suitable internal caches, where appropriate. As an example and not by way of limitation, processor 502 may include one or more instruction caches, one or more data caches, and one or more translation look-aside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. The present disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include an HDD, a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch-screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 502 (such as, for example, one or more internal registers or caches), one or more portions of memory 504, one or more portions of storage 506, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
by one or more computing devices,
executing an embedded application within the context of a first client application, wherein executing the embedded application comprises:
executing application logic to adjust states of one or more display objects;
rendering the one or more display objects that are associated with a stage definition in a display region of the first client application, the rendering is configured to process the one or more display objects ordered in a hierarchy structure of game object definitions, wherein the one or more display objects change based on changes to scenes being rendered and continuing to process the display objects of the hierarchy structure during the rendering of the scenes;
in response to a trigger event, causing the first application to generate an interface component in the display region and pausing the rendering of the embedded application by:
generating a bitmap image to define a static image based on the states of the one or more display objects associated with the stage definition;
associating the static image with the stage definition; and
disassociating the one or more display objects from the stage definition while maintaining the hierarchy structure of game object definitions of the one or more display objects in memory,
the embedded application is configured to stop processing the one or more display objects during a time period of disassociation,
wherein during the time period disassociation the stage definition is not associated with the hierarchy structure of game object definitions of the one or more display objects and is instead associated with the static image which causes the rendering to cease processing; and resuming the rendering of the embedded application by associating the hierarchy structure of game object definitions of the one or more display objects maintained in memory with the stage definition; and disassociating the static image from the stage definition, which causes the rendering to resume processing using the hierarchy structure of game object definitions of the one or more display objects, without reconstructing the hierarchy at resume of the embedded application.

2. The method recited in claim 1, wherein the application logic is executed while the interface component is displayed.

3. The method recited in claim 1, wherein the interface component is generated within the context of the first client application and outside the context of the embedded application.

4. The method recited in claim 1, further comprising, if there is any rendering conflict in connection with the rendering of the embedded application when the trigger event occurs, then clearing the rendering conflict before generating the static image.

5. A system, comprising:

a memory comprising instructions executable by one or more processors; and one or more processors coupled to the memory and operable to execute the instructions, the one or more processors being operable when executing the instructions to:

execute an embedded application within the context of a first client application, wherein to execute the embedded application comprises:

execute application logic to adjust states of one or more display objects;

render the one or more display objects that are associated with a stage definition in a display region of the first client application, the rendering is configured to process the one or more display objects ordered in a hierarchy structure of game object definitions, wherein the one or more display objects change based on changes to scenes being rendered and continuing to process the display objects of the hierarchy structure during the rendering of the scenes;

in response to a trigger event, cause the first application to generate an interface component in the display region and pausing the rendering of the embedded application by:

generate a bitmap image to define a static image based on the states of the one or more display objects associated with the stage definition;

associate the static image with the stage definition; and disassociate the one or more display objects from the stage definition while maintaining the hierarchy structure of game object definitions of the one or more display objects in memory, the embedded application is configured to stop processing the one or more display objects during a time period of disassociation wherein during the time period disassociation the stage definition is not associated with the hierarchy structure of game object definitions of the one or more display objects and is instead associated with the static image which causes the rendering to cease processing;

wherein rendering of the embedded application is resumed by associating the hierarchy structure of game object definitions of one or more display objects maintained in memory with the stage definition, and disassociating the static image from the stage definition, which causes the rendering to resume processing using the hierarchy structure of game object definitions of the one or more display objects, without reconstructing the hierarchy at resume of the embedded application.

6. The system recited in claim 5, wherein the application logic is executed while the interface component is displayed.

7. The system recited in claim 5, wherein the interface component is generated within the context of the first client application and outside the context of the embedded application.

8. The system recited in claim 5, wherein the one or more processors are further operable when executing the instructions to, if there is any rendering conflict in connection with the rendering of the embedded application when the trigger event occurs, then clear the rendering conflict before generating the static image.

\* \* \* \* \*